(12) United States Patent
Kittrell

(10) Patent No.: US 8,898,808 B1
(45) Date of Patent: Nov. 25, 2014

(54) SYSTEM AND METHOD FOR ASSESSING EFFECTIVENESS OF ONLINE ADVERTISING

(71) Applicant: Ghostery, Inc., New York, NY (US)

(72) Inventor: John Wesley Kittrell, Brooklyn, NY (US)

(73) Assignee: Ghostery, Inc., New York, NY (US)

(*) Notice: Subject to any disclaimer, the term of this patent is extended or adjusted under 35 U.S.C. 154(b) by 0 days.

(21) Appl. No.: 14/152,480

(22) Filed: Jan. 10, 2014

(51) Int. Cl.
*G06F 7/04* (2006.01)
*H04L 29/06* (2006.01)

(52) U.S. Cl.
CPC .................................. *H04L 63/10* (2013.01)
USPC ................................................................ 726/30

(58) Field of Classification Search
None
See application file for complete search history.

(56) References Cited

U.S. PATENT DOCUMENTS

2012/0144282 A1*  6/2012  Loeb et al. .................... 715/205

* cited by examiner

*Primary Examiner* — Brandon Hoffman
(74) *Attorney, Agent, or Firm* — Goodwin Procter LLP

(57) ABSTRACT

A system for accurately estimating global impression volumes at tag and host levels, and for computing global page views and reach estimates, collects impression volumes for various tracking technologies and for several hosts from a panel of users. The collected panel data is normalized, e.g., to minimize spurious and/or non-human activity data. A scaling factor is computed using measured global impression volume of a reference tag and impression volume of the reference tag with respect to the panel. The required global estimates are obtained by scaling the normalized panel data using the computed scaling factor.

18 Claims, 2 Drawing Sheets

SYSTEM AND METHOD FOR ASSESSING EFFECTIVENESS OF ONLINE ADVERTISING

FIELD OF THE INVENTION

This invention relates to Internet based tracking technologies, and more specifically to methods and supporting systems for estimating impression characteristics of various tracking technologies.

BACKGROUND

On-line advertising is an important technology that can generate revenues, which in turn, can make vast amounts of content and information freely available to the Internet users. On-line advertising often includes tracking user activities on the Internet and advertising based on the information collected via tracking. Tracking based advertising often raises security and user-privacy concerns, but can also increase the relevance of an advertisement to a user. As such, the Internet users may be distracted less by messages of little interest to them, and the advertisers can increase return on their investments, as the users are more likely to respond to the displayed messages that are relevant to them than random messages.

To facilitate on-line advertising, when an Internet user visits a website such as cnn.com, amazon.com, etc., a tracking technology is usually loaded on the user's computer. Tracking technologies generally include any element that can collect user data and/or implement certain functionalities, such as delivering an advertisement, installing and/or running a script, etc., based on the user data. Tracking technologies include cookie-based trackers, advertisers, publishers, ad networks, intelligence or analytics providers, ad exchanges, retargeters, conversion pixels, beacons, and widgets. A tracking ecosystem is generally considered the set of elements or technologies and their interrelationships across the Internet. An impression is an instance of any one of these tracking technologies loading on a browser, whether that load results in anything visible to the user or not.

In order to accurately measure on-line browsing behavior of a user and/or to determine the effectiveness of a tracking technology (e.g., in terms of data collection, display of messages, etc.), it is beneficial to estimate one or more characteristics of the impressions. These characteristic include impression volume across the Internet corresponding to a certain tracking technology, impression volume associated with a host of interest such as cnn.com, amazon.com. etc., the estimated number of unique viewers/recipients of a particular technology and/or webpage, etc. Some methods and systems for generating impression-related estimates merely collect data associated with the browsing activities of randomly selected users. Many of these systems do not account for the specific nature of the tracking technology to be analyzed, and do not distinguish between human browsing activity and machine-generated browsing activity. The machine-generated activity can be of little relevance to the impression characteristics, because any technology loaded due to such activity is unrelated to any human behavior or viewing. An improved method and system is therefore needed to facilitate estimation of impression data.

SUMMARY

Embodiments of the present invention enable accurate estimation of various impression characteristics. This is achieved, at least in part, by controlling the quality of raw impression data used in the estimation. To this end, raw impression data from the browser extensions installed in the web-browsers of a selected panel of users is collected. This data may be filtered to eliminate or at least reduce any spurious data generated by machine activity and/or data otherwise determined not to be representative of the Internet activities a panel user. This browser-extension data can provide a controlled set of data using which various impression characteristics such as impression volume of a particular tracking technology, impression volume corresponding to a host, etc., can be estimated via statistical projection for the entire Internet. Collection of impression data associated with a reference tracking technology, i.e., a reference tag, across the Internet and also with respect to the panel users can facilitate the extrapolation.

Accordingly, in one aspect, a method for determining global impression volumes includes receiving in memory panel impression data via a communication interface or a data collector. The panel impression data is associated with a number of tags, and is collected from a selected panel of computers. The tags include a reference tag. The method also includes preprocessing the received panel impression data to obtain normalized impression data for each of the several tags. The preprocessing includes reconstruction of supplemental data to balance, in the panel impression data, an inaccuracy associated with a first privacy setting. The method further includes receiving in the memory, via the communication interface, global impression data from one or more computers different than any computer in the selected panel. The global impression data includes global reference tag data for the reference tag.

In addition, the method includes computing an up scaling factor based on, at least in part, a ratio of the global reference tag data to the normalized impression data associated with the reference tag. The method also includes computing, for a specified tag within the several tags, global impression volume based on, at least in part, the upscaling factor and the normalized impression data associated with the specified tag.

In some embodiments, the reconstruction includes configuring a crawler according to a second privacy setting different than the first privacy setting, and receiving in the memory additional panel impression data using the crawler. The method may further include adjusting the panel impression data based on, at least in part, the additional panel impression data. To this end, the method may include partitioning the panel impression data for a specified time period into blocking disabled data and blocking enabled data, and adding the additional panel impression data for that time period to the blocking disabled data. The method may also include grouping the blocking disabled data by a set of unique combinations of hosts, tags, and tag dimensions, and grouping the blocking enabled data by the set of unique combinations of hosts, tags, and tag dimensions, as well.

In addition, the method may include computing a blocking enabled percentage of a count of a selected type of blocking enabled data for a specified unique combination in the set based on a count of the selected type of blocking enabled data for a host associated with the specified unique combination. The method may further include computing a blocking disabled percentage of a count of the selected type of blocking disabled data for the specified unique combination in the set based on a count of the selected type of blocking disabled data for the host associated with the specified unique combination. Adjusting the panel impression data may include increasing the count of the selected type of blocking enabled data for the specified unique combination, based on, at least in part, a ratio of the blocking disabled percentage to the blocking enabled percentage. The selected type may be either impressions or member unique keys.

In some embodiments, preprocessing includes computing, for a selected tag, a tag frequency corresponding to a tag-host pair, using panel impression data associated with the selected tag. The method may also include determining validity of the panel impression data associated with the tag-host pair based on, at least in part, the tag frequency, and eliminating from the panel impression data the panel impression data associated with the tag-host pair and determined to be invalid. The preprocessing may include, additionally or in the alternative, at least partially filtering out panel impression data determined to be associated with machine activity.

The filtering may include obtaining a total impression count for a specified time period for a selected member unique key, and comparing the total impression count with a specified threshold based on a total number of tags. The filtering may further include eliminating from the panel impression data, impression data corresponding to the selected member unique key. In some embodiments, the filtering includes obtaining a page count for a specified time period for a selected member unique key and eliminating from the panel impression data, impression data corresponding to the selected member unique key if the page count exceeds a specified threshold.

In some embodiments, the global impression volume includes tag-level global impression volume, and the method includes computing the tag-level global impression volume. The computation of tag-level global impression volume includes selecting a tag, and designating tag-level global impression volume as a product of the upscaling factor and the normalized impression data associated with the selected tag. The method may include computing global reach estimates for the selected tag by counting a number of distinct member unique keys for the selected tag using: (i) the normalized impression data associated with the selected tag, and (ii) reconstructed panel data, and scaling the number of distinct unique keys using a ratio of the tag-level global impression volume to the normalized impression data associated with the selected tag.

In some embodiments, preprocessing includes, prior to computing the upscaling factor, identifying a set of hosts associated with the panel impression data. To identify the set of hosts, the method includes for each host, determining if the host is significant, and isolating from the panel impression data, impression data associated with the significant hosts. The method may also include winsorizing the isolated impression data associated with the significant hosts, to obtain the normalized impression data.

In some embodiments, the global impression volume may include host-level global impression volume, and the method may include computing the host-level global impression volume, which may include computing a downscaling factor. The downscaling factor may include a ratio of the isolated impression data and the panel impression data. To compute the host-level global impression volume, the method may include selecting a host, and for each tag associated with the selected host, aggregating normalized impression data associated with the tag. In addition, the method may include designating host-level global impression volume as a product of the upscaling factor, the downscaling factor, and aggregated normalized impression data.

In some embodiments, the method includes computing global page view estimates for the selected host by computing page views for the selected host on a specified day using the normalized impression data. The method may also include scaling the computed page views by a ratio of the host-level global impression volume to aggregated normalized impression data.

In another aspect, a system for determining global impression volumes includes a data collector for collecting: (i) from a selected panel of computers, panel impression data associated with several tags including a reference tag, and (ii) global impression data from one or more computers distinct from any computer in the selected panel. The global impression data may include global reference tag data for the reference tag. The system also includes a data reconstructor to reconstruct supplemental data so as to balance an inaccuracy associated with a first privacy setting in the panel impression data. Normalized impression data for each of the several tags can be obtained using the reconstructed data that may include the supplemental data.

The system further includes an analyzer for computing an upscaling factor based on, at least in part, a ratio of the global reference tag data to the normalized impression data associated with the reference tag, and an estimator for computing, for a specified tag within the several tags, global impression volume based on, at least in part, the upscaling factor and the normalized impression data associated with the specified tag.

In some embodiments, the system includes a first filter for removing at least some crawler data from the collected panel impression data. The system may also include a second filter for identifying a set of hosts, such that the panel impression data associated with each host in the set is statistically significant. The analyzer may be further configured to compute a downscaling factor based on, at least in part, a ratio of impression data associated with the set of hosts and the panel impression data. The estimator may be further configured to compute one or more of: (i) global host-level impression volume, (ii) global host-level page views estimate, and (ii) global reach estimates.

BRIEF DESCRIPTION OF THE FIGURES

In the drawings, like reference characters generally refer to the same parts throughout the different views. Also, the drawings are not necessarily to scale, emphasis instead generally being placed upon illustrating the principles of the invention.

DETAILED DESCRIPTION

Data Collection

Figure 1:
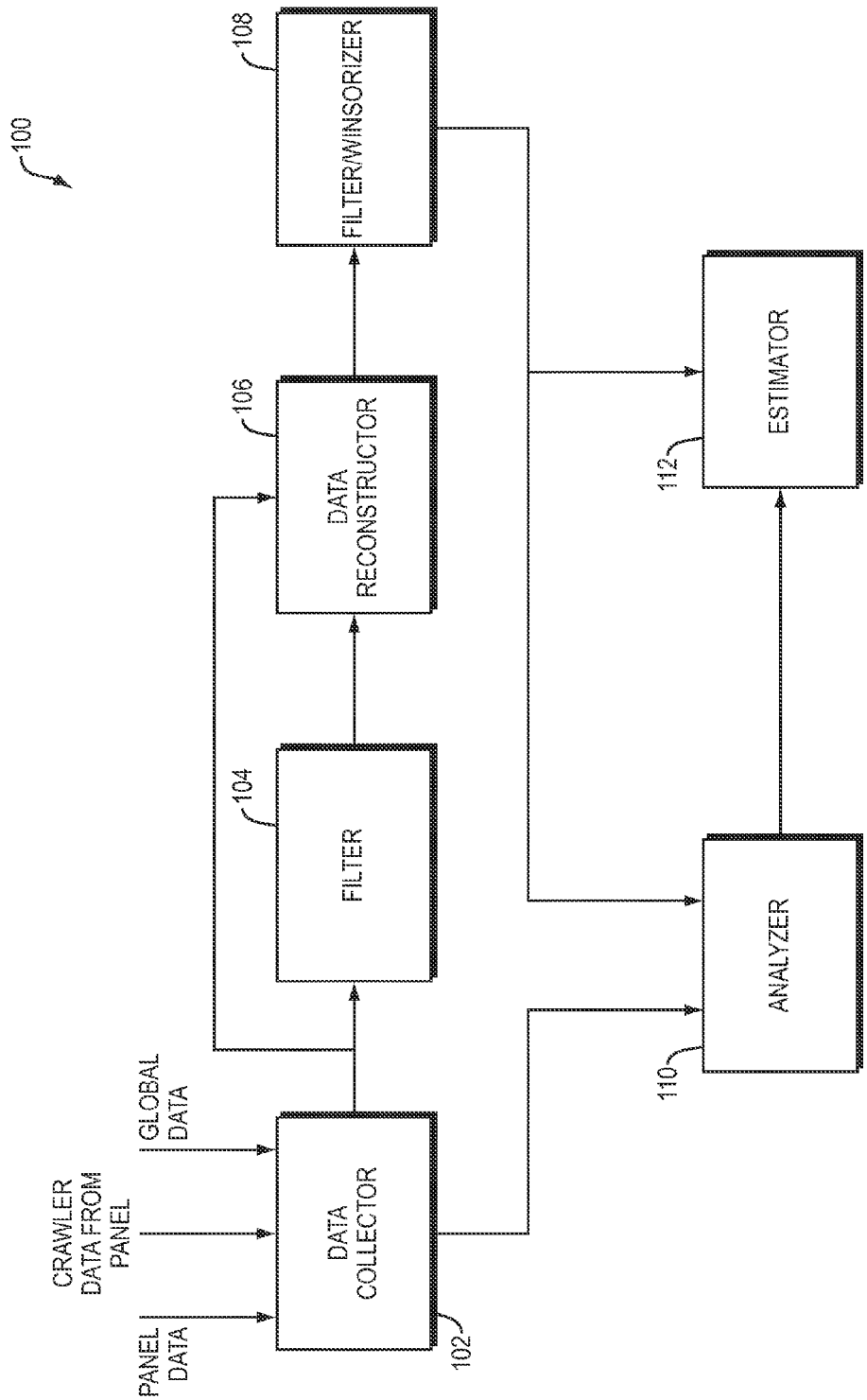
FIG. 1 schematically depicts a global impression, page views, and reach estimation system, according to one embodiment.

With reference to FIG. 1, in a global impression, page views, and reach estimation system 100 data is collected by a data collector 102 on various tracking technologies as these tracking technologies may be encountered during browsing by the members of a selected group, e.g., a group of about eight million unique Internet users who have installed a browser extension enabling data collection. The collected data typically includes URL paths on which the tracking technologies are found and their URL source codes. These Internet users in the selected group are members of an opt-in panel of users of a browser extension that enables browser-level blocking of tracking technologies (e.g., Ghostery, at www.ghostery.com). Members of this panel use the extension to exercise control over the users' personal data, in addition to improving browser performance. As a result, a majority of panel members likely have blocking of tracking technologies enabled. As such, the raw data collected from the panel can provide an incomplete picture of the tracking ecosystem because when a certain tracking technology is blocked, any other third party tracking technologies associated with the blocked technologies are generally not loaded. Therefore, in addition to global browser-level data obtained from the panel, various embodiments employ an Internet crawler to supplement the raw data and to provide snapshots of what panel members would experience if blocking were disabled. The data collected from the panel representing user activity, in combination with the crawler data can provide more accurate information about the various tracking technologies.

One type of data point, which is most granular in some embodiments, is an impression. Typically, two URLs are associated with an impression: (i) url_path is the URL on which the tracking technology is encountered (e.g., the tracking technology ChartBeat is loaded when on the url_path www.cnn.com/POLITICS/; and (ii) bug_source_url is another URL that is loaded by the browser while on a url_path. For example, while on the url_path www.cnn.com/POLITICS/, the bug_source_url that ChartBeat loads on a browser is http://static.chartbeat.com/js/chartbeat.js). The bug_source_url can be analyzed via a classification system, e.g., using a curated library of bug_source_url patterns, so that the function and/or purpose of each tracking technology can be determined.

Preprocessing

In various embodiments, the raw data obtained from a panel is processed through one or more levels of preprocessing and/or normalization, e.g., to facilitate further analysis of the collected data and/or to conform to any user privacy requirements. To this end, in some embodiments a tag-host filter is applied, e.g., the filter 104 depicted in FIG. 1, to the raw panel data to identify and analyze tag-host pairs. A host is the root of a url_path (e.g., the host of www.cnn.com/POLITICS/ is www.cnn.com). The word "tag" is generally synonymous with "tracking technology." In the example above, the tag-host pair generated by an impression of the tracking technology, i.e., tag ChartBeat on www.cnn.com/POLITICS/ is (ChartBeat, www.cnn.com).

In general, a tag is determined to be valid relative to a host, and this validity is determined using the impressions of that tag-host pair that are recorded in the raw panel data. For example, if in the collected raw data over a specified trailing period (e.g., a week, month, etc.), the impressions generating the tag-host pair to be tested for validity (e.g., ChartBeat, www.cnn.com) are encountered on a specified fraction of the time period (e.g., on at least 26 days of the trailing month), the tag (e.g., ChartBeat) is determined to be valid relative to the corresponding host (e.g., www.cnn.com).

To determine the validity of a tag-host pair, a scoring procedure based on two factors may be used to validate the tag-host pairs identified from the raw data. In one embodiment, these factors are (i) tag frequency, and (ii) static path location. Tag frequency includes a time-series of a tag-host pair, indicating the times of a certain day at which the corresponding impressions were recorded. To illustrate, (ChartBeat, www.cnn.com) may be generated by impressions at 1 pm, 1:33 pm, 3:04 pm, etc., on a particular day. Static path location measures whether a tag-host pair is generated by only a specific url_path or whether the impressions corresponding to the pair appear on several different url_paths corresponding to the host. The pair (ChartBeat, www.cnn.com), for example, may be generated exclusively by the url path www.cnn.com/POLITICS/ or by other url_paths associated with the host www.cnn.com, such as www.cnn.com/SPORTS/, www.cnn.com/MONEY/, etc.

With respect to tag frequency, if a tag appears consistently on a page over a specified time period (e.g., a month), the corresponding tag-host pair is considered to be valid. The consistency may be determined as a specified, threshold number of times the tag must occur at a certain url_path associated with the host. With respect to the static path location, if a tag occurs in association with a host less frequently than that required by the specified threshold, but occurs in a specific area of a website related to the host, such as a search API, or the search area of a user's website, the tag-host pair is considered to be valid, subject to certain additional threshold limits. The tag may not be seen often, in part, because it may be loaded by only a subset of pages or url_paths associated with the corresponding host. A search box, e.g., may be provided only on the homepage. As an exemplary additional threshold limit, a tag-host pair (AdRoll, www.urbandictionary.com) is considered to be valid if the tag AdRoll is seen on the host www.urbandictionary.com more than two-thirds of the days over the trailing month.

The filter 104 described above can exclude from the collected data any spurious data points that may be produced by some browser extensions or other components that often inject elements into pages that do not represent actual impressions of tracking technologies. For example, the browser extension https://chrome.google.com/webstore/detail/netflix-rate/ecaaapiecdienibfgolcopgnicppkmhn can injects elements in netflix.com, causing reviews from rottontomatoes.com to be over-laid in Netflix movie icons. Reddit toolbars: http://www.reddit.com/wiki/toolbar, may also inject spurious data, e.g., by opening pages that are not native to the Reddit domain within reddit.com, and may thus create invalid impression data. A frequency analysis as part of tag-host filtering as described above can minimize the impact of such spurious data on the ultimate computation of volume and reach estimates in part because only a subset of panel members may generate spurious data points.

Various embodiments include an additional step to eliminate or at least minimize the inclusion of data resulting from abnormal amounts of volume created by certain kind of users, e.g., web crawlers. In order to abide by a typical privacy policy of the browser extension installed into the browsers of the panel users, IP addresses of those users are not logged. Instead IP addresses and user agents are hashed together into a member unique identifier. In some embodiments, a blacklist of unique identifiers is then constructed, e.g., by the filter 104, as follows. For a selected day, hour, and member unique key, all pages visited by that member unique key within the selected time frame are isolated from the collected panel data. If the member unique has a total impression count that exceeds the maximum number of elements over all pages times a specified constant (e.g., the number of seconds per hour, i.e., 3,600), that member unique is unlikely to correspond to a human user, and is likely associated with a web crawler. Therefore, that member unique is blacklisted for the day. Likewise, if the member unique visits in excess of 720 pages in one hour (i.e., on average one page every five seconds for one hour), that member unique is blacklisted for the day. The data associated with any blacklisted member unique is removed from the panel data, so that the panel data likely corresponds only to browsing activities by human users.

After filtering the collected panel data as described above, the filtered data may be partitioned into two segments: a segment corresponding to the panel users who have enabled blocking of tracking technologies, and a segment corresponding to the panel users who have not enabled such blocking.

Like hashing the IP addresses of users to ensure complete anonymity of the browser-level data, this step is related to the privacy-specific nature of the browser extension. Many panel members use the browser extension tool to gain better control over their personal data. As a result, the segment of the raw data collected when blocking is enabled provides an incomplete picture of the tracking ecosystem.

In various embodiments, this data is, therefore, reconstructed using a data reconstructor 106, based on, at least in part, the ecosystem map provided by the segment of the data collected with blocking disabled. Specifically, data collected for the blocking disabled segment includes data collected using a web crawler that scans several thousand (e.g., 10 k, 20 k, etc.) URLs per week, with the browser extension installed and blocking disabled. This web crawler data is not included in the raw panel data and does not contribute to the raw volume numbers, as it gets filtered-out, as described above. The web-crawler data, however, is used within the mapping stages to adjust the data in the blocking enabled segment, so that the overall collected data may accurately represent the browsing activities of typical Internet users. Different embodiments employ two different ways of reconstructing the collected raw data.

Volume Reconstruction: From the browser-extension data collected during the trailing week, which may be filtered as described above, the data corresponding to a specified day and to the segment of panel users who have blocking disabled is isolated, e.g., by the data reconstructor 106. The isolated data is then grouped by unique combinations of hosts, tags, and tag dimensions. Tag dimensions typically are tag-specific categories and functionalities. For example, a retargeting tag Dotomi may be encountered in two separate functionalities: when the tag is collecting data, or when the tag is serving advertisements. The blocking-disabled data provides a road map of what typical users may experience when blocking is disabled. Such typical users likely include a vast majority of Internet users who generally do not have any tracker-blocking browser extension installed in their browsers.

Using the browsing disabled data, a dimension map, i.e., a percentages volume per dimension is computed for the impression volume for each tag-host pair. For example, for the exemplary tag Dotomi, the percentage of the data collection dimension may be 5% and that of the advertisement dimension may be 8% for a host www.nbc.com. After computing such percentages for various dimensions of different tags, the filtered browser-level data corresponding to the users of the panel who have blocking enabled for the selected day is isolated, e.g., by the data reconstructor 106. In one embodiment, if the impression volume of a unique dimension combination as a percentage of the total impression volume for the host is less than the corresponding percentage in the dimension map, the number of impressions for that unique dimension combination is increased by the data reconstructor 106 until the percentage thereof is approximately the same as the corresponding percentage in the dimension map. For example, if a certain DoubleClick javascript pattern makes up 1 K impressions of a total of 100 K impressions for www.cnn.com, and if the percentage of the javascript pattern is about 5% of all of the impressions for this host according to the dimension map, in some embodiments about 4 K impressions are added to this DoubleClick dimension (i.e., the javascript pattern) count.

Member Unique Key Reconstruction: One disadvantage of volume reconstruction is that, although it is computationally easier to simply increase numbers of impressions according to certain percentages computed as described above, member unique keys are likely undercounted, because each new impression number should have a member unique key associated therewith. It is beneficial, therefore, to account for these missing member unique keys in the reconstruction process. In one embodiment, this is accomplished, at least in part, similarly as in the volume case, but instead of adjusting volume counts distinct member unique counts are adjusted by the data reconstructor 106.

In particular, as snapshot is taken within the blocking disabled data for the trailing week, in which a percentage of distinct member unique keys for each dimension of each tag based on the total distinct members unique keys associated with a selected host is computed. The percentage computation may be repeated for each host. The filtered browser-level data corresponding to the users of the panel who have blocking enabled is isolated. If the number of entries in the set of member unique keys associated with a unique dimension combination, as a percentage of the total number of member unique keys for the host is less than the corresponding percentage in the dimension map, additional impression rows are added with randomly selected member unique keys for that unique dimension combination until the percentage of the number of member unique keys is approximately the same as the corresponding percentage in the dimension map. For example, based on browser extension data, if there are 10 K distinct member unique keys that visited www.cnn.com in a given day, only 500 of which encountered a particular dimension of DoubleClick, and if the dimension map indicates that 10% of unique users should actually encounter this particular dimension of DoubleClick, then from the pool of 10 K member unique keys, about 500 keys are selected randomly and added to the set of member unique keys associated with the tested dimension by the data reconstructor 106.

Computation of Global Impression Volume Estimates

In various embodiments, after one or more of the preprocessing steps have been completed, estimation of global impression volumes is performed. Because the browsing data obtained from the browser extensions installed by the panel users generally represents only a fraction of the overall Internet activity, data from a reference notice tag is used to compute impression and reach estimates via scaling. "Evidon Ad Notice," that generates about two billion impressions per day, is an exemplary reference tag. Various embodiments do not depend on this specific tag, however, and any reference tag that generates a large number of impressions (hundreds of million, billions, tens of billion, etc.) per day can be used.

In one embodiment, the data collected from the reference tag by the data collector 104 is not mined or altered in any way, as this data enables scaling that can provide global estimates. As such, the reference tag data may include data generated by crawlers. This, however, is often not a significant issue as it may be with the panel data collected from browser extensions, because the impression volume numbers corresponding to the reference tag data are much larger (e.g., on the order of a few billions) than the volume numbers for the browser extension data, which are typically on the order of a few million or tens of million. The presence of crawler data may introduce a margin of error in the computation of global impression and reach estimates. This margin of error, however, is likely uniform across the impressions of different tracking technologies, assuming that the crawlers merely jump from one URL to another. Therefore, the analysis of the effectiveness of a tag in association with one host relative to another host may not be affected significantly by the inclusion of the crawler data.

In various embodiments, first, at the level of browser-extension, i.e., panel data, a universe of hosts is isolated for which there is adequate data to make statistically significant estimates of global impression volume in a filter/winsorizer 108. In some embodiments, to determine such adequacy, for a host h on a day d it is required that the host h generates some impressions for each day over the week trailing the day d, and that the host h generates impressions for at least two-thirds of the hours over all of the hours of the week trailing the day d. To facilitate this analysis, the panel data is represented as a time-series of aggregated impression volume for the host h over the week trailing the day d, including the day d. The aggregation of impression volumes may be performed for a selected period of the day, e.g., for each hour.

In some embodiments, the time series is normalized by the filter/winsorizer 108 using winsorization, as follows. Let m be the largest term in the time-series such that when the term m is removed from the arithmetic average of all terms in the time-series, the average value does not change by more than 10%. Then, for each term j in the time-series, if the removal of j in the arithmetic average of all terms in the time-series causes the average value to change by more than 10%, replace the value j by the value m. Finally, re-aggregate these selected period-based (e.g., hourly) winsorized values to the daily level, and the value on d is designated as the normalized impression volume for the host h on the day d. After winsorization and normalization, the panel data is represented as a master universe U of hosts with the associated normalized impression volume numbers. The normalized impression data associated with a specified tag t1 includes a sum of impression volumes corresponding to all tag-host pairs (t1, $h_i$) for all hosts $h_i$ in U.

An advantage of the normalization described above is that this step can control idiosyncratic impressions that may not be filtered through the filters applied during the preprocessing stage. For example, the tag Disqus usually appears in comment sections of webpages. If a panel member visits a blog or an article that has Disqus present, and leaves a number of comments, the impression volume corresponding to that panel user may increase, inflating the impression volume for the corresponding tag-host combination, based on the activity of one user. The recorded impression volume is inaccurate because the panel user did not visit the host several times. The host was visited only once, but impression volume increased in part because the tag was associated with the comments section and because the panel user left several comments. Winsorization can trim the impression volume for such users, so as to accurately reflect the impression volume corresponding to a majority of users.

In one embodiment, global impression volume estimates are first computed at the tag level using an estimator 112. Let N be the global impression volume of the reference tag (e.g., Evidon Ad Notice tag) on a given day d. As described above, this impression volume is a global number because the impression volume is unadjusted. Let n be the impression volume of the same reference tag within the master universe U of the normalized browser-level data. A tag t and the dimension breakdown x:{x1, x2, . . . xl} thereof are selected to determine the global impression volume for the tag t. Global impression volume for a dimension x1 on the day d is estimated as follows: Let m be the impression volume for the selected dimension x1 on the day d within the master universe U. The global impression volume for the dimension x1 on the day d is estimated to be the value (N m)/n. The up-scaling factor (N/n), computed by the analyzer 110, represents a ratio of the global impression volume of the reference tag to the impression volume of the reference tag within the master universe U. Therefore, for any candidate tag/tag dimension, if the impression volume in the master universe is scaled up by the up-scaling factor (N/n), a global estimate of the impression volume for that tag/tag dimension can be obtained. In general, a tag-level global impression estimate can be expressed as: $g_t = m_t \times N/n$, where $g_t$ is the tag-level estimate of global impression volume for a selected tag t, and $m_t$ is a tag-level impression volume with the master universe U, for the selected tag t.

In some embodiments, host-level estimates are obtained from the computed tag-level estimates using the estimator 112. The host-level impression volume usually means how many times within a certain time period a particular host loaded a set of different tags. The impression volumes, in general, are additive, and as such, the tag-level estimates readily provide rough host-level estimates. Specifically, within the master universe U for a given host h, a rough estimate of global host-level impressions can be obtained as a sum of the number of impressions for each tag on the host h, scaled up using the up-scaling factor described above. The rough estimate can be an accurate estimate if the hosts included in the master universe U accurately represent the entire Internet. The master universe U, however, typically includes significantly fewer hosts than the total number of hosts visited by the users of the Internet. An exemplary master universe may include only about 15 K hosts, accounting for only about 20% of the number of hosts generating impression volume of the Internet, as determined using the raw browser-level data. In other words, the master universe U includes only those hosts that are determined to contribute to the impression volumes in a statistically significant manner. The global impression volumes, include the impression volumes generated by these hosts and also by many other hosts that may not generate, on average, as many impressions as the hosts included in the master universe U.

As such, the up-scaling factor (N/n) can produce an overestimate of the global impression volumes for the host h. Therefore, in some embodiments, each of the rough host-level estimates, which is likely an overestimate of the global host-level impression volume, is scaled-down by a down-scaling factor computed by the analyzer 110 as the ratio of impression volume for the master universe U to the total browser-level impression volume, on a periodic (e.g., daily) basis. Thus, in general, a host level, global estimate of impression volume can be described as: $g_h = (\sum_{t=1}^{T_h} g_t) \times V_U / V_{BE}$, where $T_h$ is the number of tags generating impressions on the host h within the master universe U, $g_t$ is the global tag-level impression volume for tag t, $V_U$ is the impression volume of the master universe U, and $V_{BE}$ is the total impression volume collected, and optionally filtered, at the browser level, which includes impression volume associated with the hosts that are not included in the master universe U.

Computation of Global Page Views Estimates

Global host level page views may be considered to be the number of times a particular host loaded a specified tracking technology. In one embodiment, an estimate of host-level page views is computed by the estimator 112 for a selected host using the computed global estimate of host-level impression volume for that host. Specifically, a global page views estimate for a host h on a day d can be obtained as:

((global impression volume estimate for h on d)/(impression volume for h on d within U))*(page views for h on d within U).

It suffices, then, to compute the page views for h on d within U, which can be achieved by dividing member unique key data from the preprocessing stage into five second intervals, and by counting the number of distinct unique users having impressions within each interval for each unique URL path. Double counts may be subtracted thereafter. The double counts are subtracted because if a browser happens to be loading a page and if the loading continues are the next five second partition demarkation, the associated unique user is counted once for one partition and again for a second, immediately succeeding partition.

In some embodiments, double counts as described above are computed using congruence arithmetic. A set of seconds on a specified day is partitioned into five sets, i.e., modulo 5 partitioning is performed. As such, five congruence classes: [0], [1], [2], [3], and [4] are obtained. First member uniques that were counted in classes [4] and [0] and that are one second away from each other (e.g., a browser that was loading a page at 5:36:04 pm and still loading at 5:36:05 pm), are add to the double counts. Likewise member uniques that were counted at classes [4] and [1] and that are two seconds away from each other, jumping over one second, (e.g., a browser that was loading a page at 5:36:04 pm, did not load any tag at 5:36:05 pm, but then loaded a tag at 5:36:06 pm), are also add to the double counts. This analysis of double counts is repeated for all other one-second jumps, e.g., member uniques counted at classes [3] and [0] and that are two seconds away.

The analysis of double counts is also repeated for all two-second jumps. These include, for example, member uniques that were counted at classes [2] and [0], [3] and [1], and/or at [4] and [2], that were three seconds away, but jumping over two seconds. In some embodiments, similar analysis can also be performed to three and four second jumps, though these are not highly likely. The counting of congruence class jumping, thus, yields all of the double counts. These double counts are then subtracted from the count of distinct member unique keys per URL path per five-second interval groupings.

Global Reach Estimates

In some embodiments, estimates of global reach are computed by the estimator 112 using the ratio of global impression volume to impression volume within U. In this computation, however, generally the reconstructed set of member unique keys is used. Thus, on a specified day d for a tag and associated dimension breakdown, x, the global reach estimate for x on day d is:

((global impression volume estimate for x on d)/(impression volume for x on d within U))*(count of distinct member unique keys for x on d within U).

Example

Figure 2:
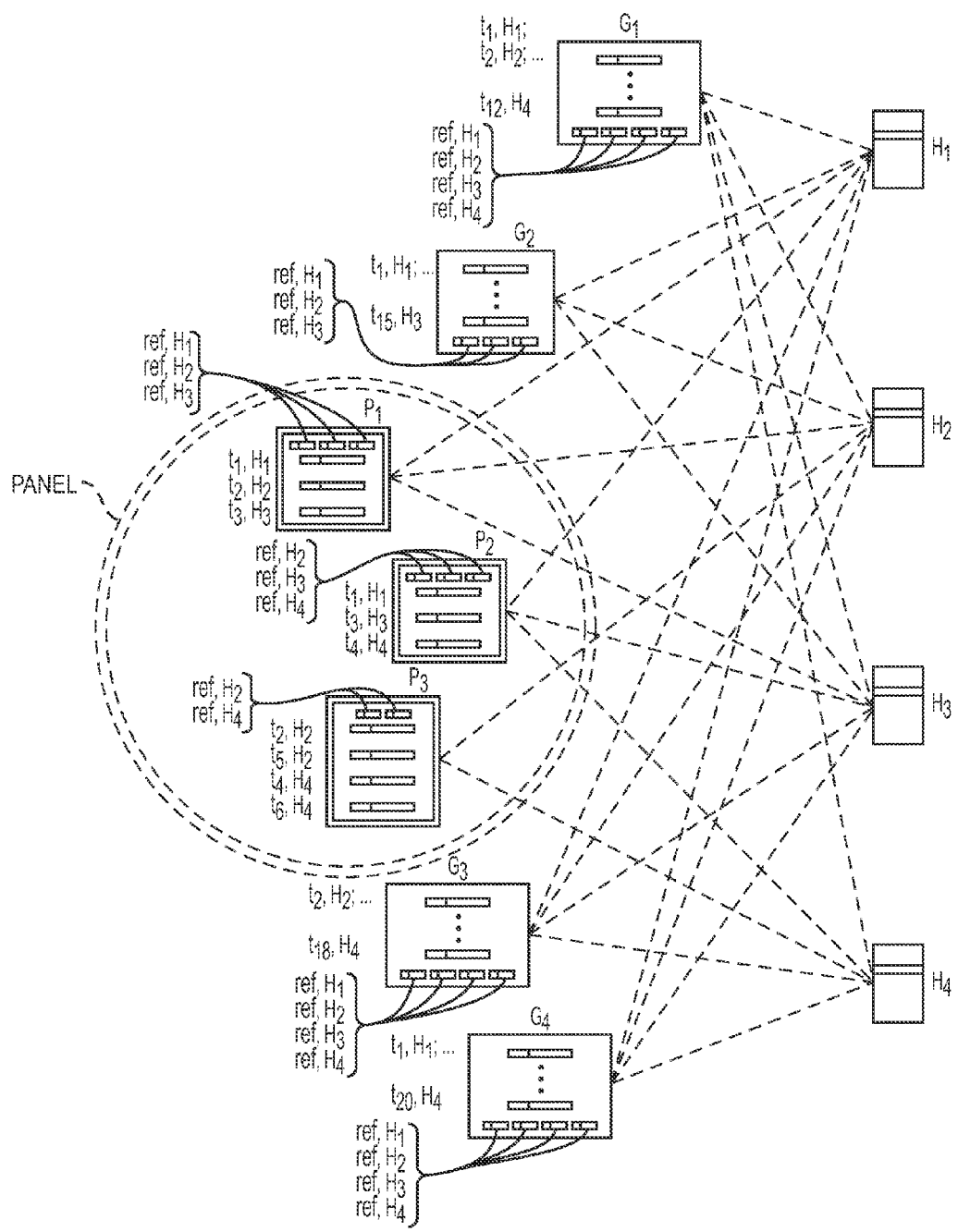
FIG. 2 illustrates an exemplary echo-system, collection of data, and analysis thereof enabling estimation of various impression characteristics, according to one embodiment.

With reference to FIG. 2, hosts H1, H2, H3, and H4 can load different tracking technologies (tags). The objectives are to estimate, for a specified time frame: (1) the impression volume of a certain tag (e.g., t1) as loaded by all hosts H1-H4; (2) the impression volume of all tags loaded by a certain host (e.g., H1); and (3) the impression volume of a certain tag (e.g., t1) as loaded by a certain host (e.g., H1). The various tags may be loaded on devices G1, G2, G3, and G4, and devices P1, P2, and P3. The devices P1, P2, and P3 have browser extensions installed thereon, so those are the panel devices.

For the panel devices, it can be observed that a tag-host pair (t1, H1) is loaded on P1 and P2. The observed times of loading, counts, and/or the frequencies of loading the pair (t1, H1) can be different for P1 and P2. A tag-host pair (t2, H2) is observed as loaded on P1 and P3, but not on P2. A pair (t3, H3) is observed as loaded on P1 and P2, but not on P3. A pair (t4, H4) is observed as loaded on P2 and P3. Pairs (t5, H2) and (t6, H4) also are observed as loaded on device P3, but not on P1 or P2. The observed times of loading, counts, and/or the frequencies of loading a pair (ti, Hj) for tag i and host j, and the summation of these data over all hosts j=1 through 4 can be used to compute the value of "m" in (Nm/n).

In addition, three tag-host pairs corresponding to a reference tag (e.g., Evidon tag), namely (ref, H1), (ref, H2), and (ref, H3) are observed as loaded on P1. Pairs (ref, H2), (ref, H3), and (ref, H4) are observed to be loaded on P2, and pairs (ref, H2) and (ref, H4) are observed to be loaded on P3. The observed times, counts, and/or frequencies of loading the different pairs can be different with respect to each other and, as with the non-reference tag-host pairs, these parameters can be different with respect to the different devices P1 through P3. These data can be used to compute the value of "n" in (Nm/n).

The tags t1 through t6, which are observed on the panel devices, are also loaded by the various hosts on the non-panel devices G1 through G4. The corresponding tag-host pairs are shown as loaded on G1 through G4, but these pairs are not observed. Some tag-host pairs, e.g., (t12, H4) that are not observed on the panel devices, may also be loaded on one or more of the devices G1 through G4. Though not depicted in FIG. 1, some host H5, which does not load any tag-host pair on any of the panel devices, may load a tag-host pair on one or more of the non-panel devices.

Finally, the reference-tag-host pairs are also loaded on the non-panel devices, and the loading of these pairs is observed. For example, all of the pairs (ref, H1) through (ref, H4) are observed as loaded on devices G1, G3, and G4. The pairs (ref, H1) through (ref, H3) are observed as loaded on the device G2. Again, the observed times, counts, and/or frequencies of loading the different pairs can be different with respect to different pairs, and these parameters can also be different with respect to the different devices G1 through G4. These data can be used to compute the value of "N" in (Nm/n). Once the values of N, n, and m are computed, various impression estimates can be computed as described above.

It is understood that the methods and systems described below may contain software and hardware connected to the Internet via a network. Computing devices are capable of communicating with each other via the Internet, and it should be appreciated that the various functionalities of the components may be implemented on any number of devices.

A communications network generally connects a client with a server, and in the case of peer to peer communications, connects two peers. The communication may take place via any media such as standard telephone lines, LAN or WAN links (e.g., T1, T3, 56 kb, X.25), broadband connections (ISDN, Frame Relay, ATM), wireless links (802.11, Bluetooth, etc.), and so on. Preferably, the network can carry TCP/IP protocol communications, and HTTP/HTTPS requests made by a web browser and the connection may be made between the peers and communicated over such TCP/IP networks.

The type of network is not a limitation, however, and any suitable network may be used. Non-limiting examples of networks that can serve as or be part of the communications network include a wireless or wired Ethernet-based intranet, a local or wide-area network (LAN or WAN), and/or the global communications network known as the Internet 16, which may accommodate many different communications media and protocols.

Those skilled in the art will appreciate that the invention may be practiced with various computer system configurations, including hand-held wireless devices such as mobile phones or personal digital assistants (PDAs), multiprocessor systems, microprocessor-based or programmable consumer electronics, minicomputers, mainframe computers, and the like.

The invention may also be practiced in distributed computing environments where tasks are performed by remote processing devices that are linked through a communications network. In a distributed computing environment, program modules may be located in both local and remote computer storage media including memory storage devices.

In some cases, relational (or other structured) databases may provide such functionality, for example as a database management system which stores data related to the services and consumers utilizing the service. Examples of databases include the MySQL Database Server or ORACLE Database Server offered by ORACLE Corp. of Redwood Shores, Calif., the PostgreSQL Database Server by the PostgreSQL Global Development Group of Berkeley, Calif., or the DB2 Database Server offered by IBM.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or non-volatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, or another operating system of platform.

At a minimum, the memory includes at least one set of instructions that is either permanently or temporarily stored. The processor executes the instructions that are stored in order to process data. The set of instructions may include various instructions that perform a particular task or tasks. Such a set of instructions for performing a particular task may be characterized as a program, software program, software, engine, module, component, mechanism, or tool.

The system may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript, for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/non-removable, volatile/non-volatile computer storage media. For example, a hard disk drive may read or write to non-removable, non-volatile magnetic media. A magnetic disk drive may read from or writes to a removable, non-volatile magnetic disk, and an optical disk drive may read from or write to a removable, non-volatile optical disk such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Although internal components of the computer are not shown, those of ordinary skill in the art will appreciate that such components and the interconnections are well known. Accordingly, additional details concerning the internal construction of the computer need not be disclosed in connection with the present invention.

The foregoing discussion discloses and describes merely exemplary embodiments of the present invention. As will be understood by those skilled in the art, the present invention may be embodied in other specific forms without departing from the spirit or essential characteristics thereof. Various steps as described in the figures and specification may be added or removed from the processes described herein, and the steps described may be performed in an alternative order, consistent with the spirit of the invention. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology.

The invention claimed is:

1. A method for determining global impression volumes, the method comprising performing at a processor coupled to a memory and in communication with a communication interface, the steps of:
   receiving in the memory, via the communication interface, from a selected panel of computers, panel impression data associated with a plurality of tags, at least one tag being a reference tag;
   preprocessing the received panel impression data to obtain normalized impression data for each tag in the plurality of tags, the preprocessing comprising reconstruction to balance an inaccuracy associated with a first privacy setting, in the panel impression data;
   receiving in the memory, via the communication interface, global impression data from at least one computer distinct from any computer in the selected panel, the global impression data comprising global reference tag data for the reference tag, and impression data associated with each tag comprising impression volume of that tag, representing a number of instances of that tag that were loaded;
   computing an upscaling factor based on, at least in part, a ratio of the global reference tag data to the normalized impression data associated with the reference tag; and
   for a specified tag within the plurality of tags, computing global impression volume based on, at least in part, the upscaling factor and the normalized impression data associated with the specified tag.

2. The method of claim 1, wherein the reconstruction comprises:
   configuring a crawler according to a second privacy setting different than the first privacy setting;
   receiving in the memory additional panel impression data using the crawler; and
   adjusting the panel impression data based on, at least in part, the additional panel impression data.

3. The method of claim 2, further comprising:
   partitioning the panel impression data for a specified time period into blocking disabled data and blocking enabled data;
   adding the additional panel impression data for that time period to the blocking disabled data;
   grouping the blocking disabled data by a set of unique combinations of hosts, tags, and tag dimensions;
   grouping the blocking enabled data by the set of unique combinations of hosts, tags, and tag dimensions;
   computing a blocking enabled percentage of a count of a selected type of blocking enabled data for a specified unique combination in the set based on a count of the selected type of blocking enabled data for a host associated with the specified unique combination; and
   computing a blocking disabled percentage of a count of the selected type of blocking disabled data for the specified unique combination in the set based on a count of the selected type of blocking disabled data for the host associated with the specified unique combination;
   wherein adjusting the panel impression data comprises increasing the count of the selected type of blocking enabled data for the specified unique combination, based on, at least in part, a ratio of the blocking disabled percentage to the blocking enabled percentage.

4. The method of claim 3, wherein the selected type is either impressions or member unique keys.

5. The method of claim 1, wherein the preprocessing comprises:
   computing, for a selected tag, a tag frequency corresponding to a tag-host pair, using panel impression data associated with the selected tag;
   determining validity of the panel impression data associated with the tag-host pair based on, at least in part, the tag frequency; and
   eliminating from the panel impression data the panel impression data associated with the tag-host pair and determined to be invalid.

6. The method of claim 1, wherein the preprocessing comprises at least partially filtering out panel impression data determined to be associated with machine activity.

7. The method of claim 6, wherein the filtering comprises:
   obtaining a total impression count for a specified time period for a selected member unique key;
   comparing the total impression count with a specified threshold based on a total number of tags; and
   eliminating from the panel impression data, impression data corresponding to the selected member unique key.

8. The method of claim 6, wherein the filtering comprises:
   obtaining a page count for a specified time period for a selected member unique key;
   eliminating from the panel impression data, impression data corresponding to the selected member unique key if the page count exceeds a specified threshold.

9. The method of claim 1, wherein:
the global impression volume comprises tag-level global impression volume; and
computing the tag-level global impression volume comprises:
  selecting a tag; and
  designating tag-level global impression volume as a product of the upscaling factor and the normalized impression data associated with the selected tag.

10. The method of claim 9, further comprising computing global reach estimates for the selected tag by:
counting a number of distinct member unique keys for the selected tag using: (i) the normalized impression data associated with the selected tag, and (ii) reconstructed panel data; and
scaling the number of distinct unique keys using a ratio of the tag-level global impression volume to the normalized impression data associated with the selected tag.

11. The method of claim 1, wherein preprocessing comprises, prior to computing the upscaling factor:
identifying a set of hosts associated with the panel impression data;
for each host, determining if the host is significant;
isolating from the panel impression data, impression data associated with the significant hosts; and
winsorizing the isolated impression data associated with the significant hosts to obtain the normalized impression data.

12. The method of claim 11, wherein:
the global impression volume comprises host-level global impression volume; and
computing the host-level global impression volume comprises:
  computing a downscaling factor, the downscaling factor comprising a ratio of the isolated impression data and the panel impression data;
  selecting a host;
  for each tag associated with the host, aggregating normalized impression data associated with the tag;
  designating host-level global impression volume as a product of the upscaling factor, the downscaling factor, and aggregated normalized impression data.

13. The method of claim 12, further comprising computing global page view estimates for the selected host by computing page views for the selected host on a specified day using the normalized impression data; and
scaling the computed page views by a ratio of the host-level global impression volume to aggregated normalized impression data.

14. A system for determining global impression volumes, the system comprising:
a data collector for collecting: (i) from a selected panel of computers, panel impression data associated with a plurality of tags, at least one tag being a reference tag, impression data associated with each tag comprising impression volume of that tag, representing a number of instances of that tag that were loaded, and (ii) global impression data from at least one computer distinct from any computer in the selected panel, the global impression data comprising global reference tag data for the reference tag;
a data reconstructor to reconstruct supplemental data so as to balance an inaccuracy associated with a first privacy setting in the panel impression data, thereby to obtain normalized impression data for each tag in the plurality of tags;
an analyzer to compute an upscaling factor based on, at least in part, a ratio of the global reference tag data to the normalized impression data associated with the reference tag; and
an estimator to compute, for a specified tag within the plurality of tags, global impression volume based on, at least in part, the upscaling factor and the normalized impression data associated with the specified tag.

15. The system of claim 14, further comprising a first filter to remove at least some crawler data from the collected panel impression data.

16. The system of claim 14, further comprising a second filter to identify a set of hosts, panel impression data associated with each host in the set being statistically significant.

17. The system of claim 14, wherein the analyzer further configured to compute a downscaling factor comprising a ratio of impression data associated with the set of hosts and the panel impression data.

18. The system of claim 14, wherein the estimator is further configured to compute at least one of: (i) global host-level impression volume, (ii) global host-level page views estimate, and (ii) global reach estimates.

* * * * *